(12) United States Patent
Kaplan

(10) Patent No.: US 7,938,279 B2
(45) Date of Patent: May 10, 2011

(54) WALL-HANGING SNAP-IN ORGANIZER DEVICE

(76) Inventor: Ivan Kaplan, Mount Sinai, NY (US)

( * ) Notice: Subject to any disclaimer, the term of this patent is extended or adjusted under 35 U.S.C. 154(b) by 203 days.

(21) Appl. No.: 12/338,485

(22) Filed: Dec. 18, 2008

(65) Prior Publication Data
US 2010/0155350 A1   Jun. 24, 2010

(51) Int. Cl.
A47F 5/08 (2006.01)
A47B 57/20 (2006.01)
A47B 47/04 (2006.01)
A47G 29/08 (2006.01)

(52) U.S. Cl. ............... 211/119.009; 211/90.02; 108/47; 248/304

(58) Field of Classification Search .............. 211/34, 211/35, 86.01, 87.01, 88.01, 90.01, 90.02, 211/103, 113, 117, 118, 119.004, 187, 190, 211/207; 108/47, 48, 106–108, 147.16, 152, 108/193; 224/543, 560; 248/215, 250, 304, 248/339; 312/245; D6/513, 514, 570

See application file for complete search history.

(56) References Cited

U.S. PATENT DOCUMENTS

| 956,835 A | 5/1910 | Taulman .................. 224/560 |
|---|---|---|
| 1,984,827 A | 12/1934 | Derman ...................... 312/4 |
| 2,917,187 A | 12/1959 | Bergkvist ................. 108/107 |
| 3,347,187 A | 10/1967 | Khoury .................... 108/152 |
| 4,378,070 A | 3/1983 | Matheis ................ 211/119.004 |
| 4,518,089 A | 5/1985 | Campbell ................... 211/118 |
| 4,518,278 A | 5/1985 | Koch ...................... 403/230 |
| 4,540,222 A | 9/1985 | Burrell .................... 312/257.1 |
| 4,567,834 A | 2/1986 | Pyka ......................... 108/1 |
| 4,681,477 A | 7/1987 | Fischer ................... 403/298 |
| 4,928,833 A | 5/1990 | Huizenga ................. 211/187 |
| 4,936,467 A | 6/1990 | Bobeczko ................. 211/14 |
| 5,097,771 A | 3/1992 | James, III .................. 108/42 |
| 5,140,915 A * | 8/1992 | Knape ..................... 108/109 |
| 5,349,909 A * | 9/1994 | Smit et al. ................ 108/107 |
| 5,413,297 A * | 5/1995 | Adams ..................... 248/215 |
| 5,485,932 A * | 1/1996 | Romm et al. ............. 211/87.01 |
| 5,570,642 A * | 11/1996 | Lehrman .................. 108/47 |
| 5,582,306 A * | 12/1996 | Balter et al. ................ 211/187 |
| 5,645,178 A * | 7/1997 | Conley, Jr. ............... 211/87.01 |
| 5,653,178 A * | 8/1997 | Huczka .................... 108/47 |
| 5,662,399 A * | 9/1997 | Henkel et al. ............. 312/258 |
| 5,762,213 A * | 6/1998 | Heneveld, Sr. ............ 211/187 |
| 5,819,958 A * | 10/1998 | Dement .................... 211/90.01 |
| 5,871,105 A * | 2/1999 | Whitehead et al. .......... 211/14 |
| 6,464,086 B1 * | 10/2002 | Klein et al. ............... 211/35 |
| 6,681,941 B1 * | 1/2004 | Johnson ................... 211/86.01 |
| 7,025,217 B2 * | 4/2006 | Crown et al. .............. 211/187 |
| 7,083,056 B2 * | 8/2006 | Routhier ................... 211/90.04 |
| 7,097,048 B2 * | 8/2006 | Rimback et al. ............. 211/34 |
| 7,188,741 B1 * | 3/2007 | Abdi et al. ............. 211/119.004 |
| 7,374,052 B2 * | 5/2008 | Price et al. ................ 211/86.01 |
| 2003/0085188 A1 * | 5/2003 | Klein et al. ............... 211/118 |
| 2003/0116517 A1 * | 6/2003 | Manghera ................. 211/187 |
| 2003/0150830 A1 * | 8/2003 | Crown et al. .............. 211/175 |

(Continued)

Primary Examiner — Michael Safavi
Assistant Examiner — Joshua Rodden
(74) Attorney, Agent, or Firm — Limin Wen

(57) ABSTRACT

A portable and adjustable unique organizer device for hanging on the top of wall(s) or panel(s) and a method of using the device are disclosed. The device has a frame structure with shelves and bars to store and organize various accessories or hygiene items particularly used in showers. The shelves and bars are adjustable by snapping snap-in knobs into different snap-in holes built in the frame structure.

10 Claims, 3 Drawing Sheets

U.S. PATENT DOCUMENTS

2004/0007549 A1* 1/2004 Klein et al. .................. 211/118
2004/0245192 A1* 12/2004 Hu ................................ 211/34
2005/0161419 A1* 7/2005 Lawson et al. ............... 211/189
2006/0049121 A1* 3/2006 Klein et al. .................... 211/35
2010/0270246 A1* 10/2010 Rodriguez ..................... 211/34

* cited by examiner

WALL-HANGING SNAP-IN ORGANIZER DEVICE

FIELD OF THE INVENTION

The present invention relates generally to implements for holding personal care articles routinely used in bathroom showers. More particularly, the invention relates to a wall-hanging shower caddy with snap-in mechanism for holding personal care items such as soap, shampoo, wash cloths and the like, which is adjustable in height to suit a user's preference, and which is portably and conveniently attachable to shower wall(s) or panel(s).

BACKGROUND OF THE INVENTION

Showers in common use consist essentially of a relatively smaller enclosure or stall which has a shower arm and head protruding from a wall, and which is closeable by a shower curtain or by a sliding or swinging door. Typically, an enclosure includes three walls (in the case of a lateral wall enclosure) or two walls (in the case of a corner enclosure) to define a showering/bathing area. The enclosure walls can be tiled or made of a water resistant material, such as glass or plastic. An opening to the enclosure is generally closed off by a door or curtain, which allows entry into the enclosure while preventing water from splashing outside the enclosure.

In addition to bar soap or liquid soap and wash cloths customarily used by people in bathroom showers, a variety of other articles related to personal hygiene are frequently used when showering. Such articles include containers of shampoo and hair conditioner, lotions, shavers, shaving cream, combs, brushes, and the like. While some shower enclosures are provided with one or more small shelves or ledges on which such personal hygiene items may be placed, many shower enclosures are devoid of any convenient location of adequate size for storing such items. Moreover, the shelves or ledges provided in typical shower enclosures tend to be relatively small, thereby affording insufficient space for storing articles without the likelihood of the articles being accidentally dislodged and falling to the floor of the shower enclosure.

It is known to mount accessory fixtures inside a bathing enclosure. Common accessories include shelves, dishes, racks and hooks for holding various personal hygiene items, such as soaps, hair products, shaving implements, and cloths. These accessories are typically permanently mounted to the enclosure walls and/or the door using anchored fasteners or waterproof adhesives. Alternatively, they may be integrally formed with the enclosure wall. Once the accessory is mounted in place it cannot be relocated easily, and even if it were re-installed elsewhere, the unsightly damage done to the original mounting surface would become visible.

It is desirable to have an assortment of bathing items readily accessible when taking a shower. Numerous article supporting devices, commonly called shower caddies, have been developed to support such items so that a person taking a shower can grasp the items without having to bend down or otherwise exert him or herself. A "shower caddy" is one such accessory, which includes a hook or strap that fits around the spout of the showerhead. The shower caddy has one or more small shelves typically used to hold shampoo bottles and razors.

Shower caddies have evolved over the past decade with increased popularity based on convenience and design choice. Most art-recognized devices are suspended from the shower arm or pipe, which extends from the wall of a bath area. Representative examples are described in Stroh U.S. Pat. No. 3,789,966. Each shower caddy of this type utilizes a mounting technique that restricts the caddy to a single location defined by the shower head. The overall design is not practical for many applications where faucets and soap dishes present obstacles to efficient installation. Uneven loads cause some caddies of this general design to swing from the shower head pivot. Other configurations require aesthetically displeasing mounting apparatus, which detract from the overall appearance of the surrounding area.

Certain prior art corner caddies are held in place with double-faced pressure sensitive tape. An example of this limited design is illustrated by Smith U.S. Pat. No. 4,708,310. The caddy device is necessarily mounted in a corner of the bath area. Conventional adhesives make the caddy difficult to reposition or remove for cleaning or replacement. Many adhesives fail in a humid environment causing the "loaded" caddy to fall off the mounting surface.

Several known devices have used suction cups to prevent free movement of a suspended caddy. The prior art designs generally provide for suction cups mounted on a caddy post extending in a direction perpendicular to the suction cup face. These expedients offer little strength under normal loading conditions and are insufficient by themselves to mount a caddy with any degree of reliability.

Caddies used in the bathroom are typically configured to hang on the shower arm by means of an extension or opening at the top whereby the unit is slipped onto the shower arm in a hanging position. This method of attachment is inherently unstable since it allows the unit to slide down the shower arm and, when bumped or knocked, to fall off the arm completely. Another method of hanging involves a hook formed as a half-circle having approximately the same diameter as the shower arm so that the hook will snap onto and mold itself around the shower arm. Since the hook grips the arm or pipe onto which it is hung, the attachment is slightly more secure than the first method described; however, the hook will easily unsnap when bumped or knocked, often breaking because of lack of elasticity and pliability. In addition, if the weight of the items placed on a caddy thus hung is not evenly distributed; the caddy will tend to hang in a lopsided position, often causing the items to fall off. Some caddies provide suction cups facing the shower wall to prevent the uneven distribution of the weight from causing the caddy to assume such lopsided position, but the cups rarely function well because of the grout grooves between tiles.

While some of the shower caddies allow for some position adjustment, many are somewhat unstable and some may interfere with entering and exiting the enclosure. Moreover, the degree of adjustment is typically quite limited.

The various caddy devices should overcome the shortcomings and drawbacks of prior art designs, while accommodating the requirements of modern lifestyles. Accordingly, it is an object of the present invention to provide a shower caddy device, which is capable of convenient installation.

Accordingly, there is a need for a shower caddy that has shelves that can be readily removed from a frame and can be securely reattached in substantially any order. Also, the new shower caddy device should be easily manufactured and assembled. In addition, there is a need for a shower caddy that is portable or can be relocated and also can stably support both large and small bathing items.

The present invention alleviates the above-described problems by providing a wall hanging and snap-in mechanism that can be adjusted to fit a shower wall to achieve a very secure attachment.

SUMMARY OF THE INVENTION

A novel and unique device (here called "A Wall-hanging Snap-in Organizer Device") designed for a storage accessory, particular as a shower caddy, in accordance with the present invention, is a plastic frame structure, basically having two rectangular-shaped solid plates built with snap-in holes placed at a number of different locations on the plates, horizontal shelves and bars built with snap-in knobs, and two wall hooks for holding the wall(s).

The present invention can be used as a storage organizer in any suitable situation including in showers. This over-the-wall shower caddy fits over any standard shower wall, panel or door, and has moveable shelves and bars adjust to your storage needs and can be used to organize all of your shower essentials. It is the perfect solution to help organize your bathroom. It creates instant storage space for bottles, soaps, razors, and washcloths. The adjustable shelves can be positioned at multiple heights to fit taller bottles. It also includes two hooks outside the shower wall for extra hangings. This convenient caddy also has a corner version for hanging over two shower walls within a corner.

Such adjustable shelving system for use as a shower caddy or the like includes a frame and a plurality of shelves with drainage holes which can be made from light-weighted material such as plastic or rubber materials, which will not be rusting against the effects of moisture in the shower environment. It can be manufactured in any suitable size and in many different colors that match the shower rooms or users' tastes. More importantly, for adjustment purpose, this innovative over-the-wall design has a snap-in mechanism to easily remove and reposition horizontal shelves and bars by snapping soft plastic-made knobs into the same material-made snap-in holes located in the panels, which will make the parts manufacture including these shelves and bars standardized and will make them easy to transported because of the flat packaging. With respect to clean ability, the prior art shower caddies, and in particular those constructed of wire, are difficult to clean, the present device is much easier to be cleaned since it has removable shelves and bars.

This invention relates to an adjustable shelving system, and more particularly, to an adjustable shelving system comprising a frame equipped with shelves that can be secured to the frame in substantially any position. The frame has particular use as a shower caddy. The arrangement of the shelves can be changed. Therefore, larger items, such as shampoo bottles, placed on the lower shelf will be able stand upright if the distance between the upper shelf and lower shelf is more than the height of the item. In addition, there are balance-screws at one end of the plates, which are used to stabilize the frame structure. However, it should be understood that the frame and attached shelves could be utilized for a variety of other uses. In short, the known prior shower caddies are deficient in many aspects, with such deficiencies being addressed by the present invention.

In summary, the present invention provides an applicable method and a simple, handy, novel, portable and inexpensive device to store and organize accessories in showers. More uniquely, this invention provides a shower caddy with snap-in mechanism for stabilizing and adjusting the shelves and bars within such shower caddy. A better understanding of the present invention will be had upon reference to the following detailed description when read in conjunction with the accompanying drawings.

DETAILED DESCRIPTION OF THE PREFERRED EMBODIMENTS

Figure 1:
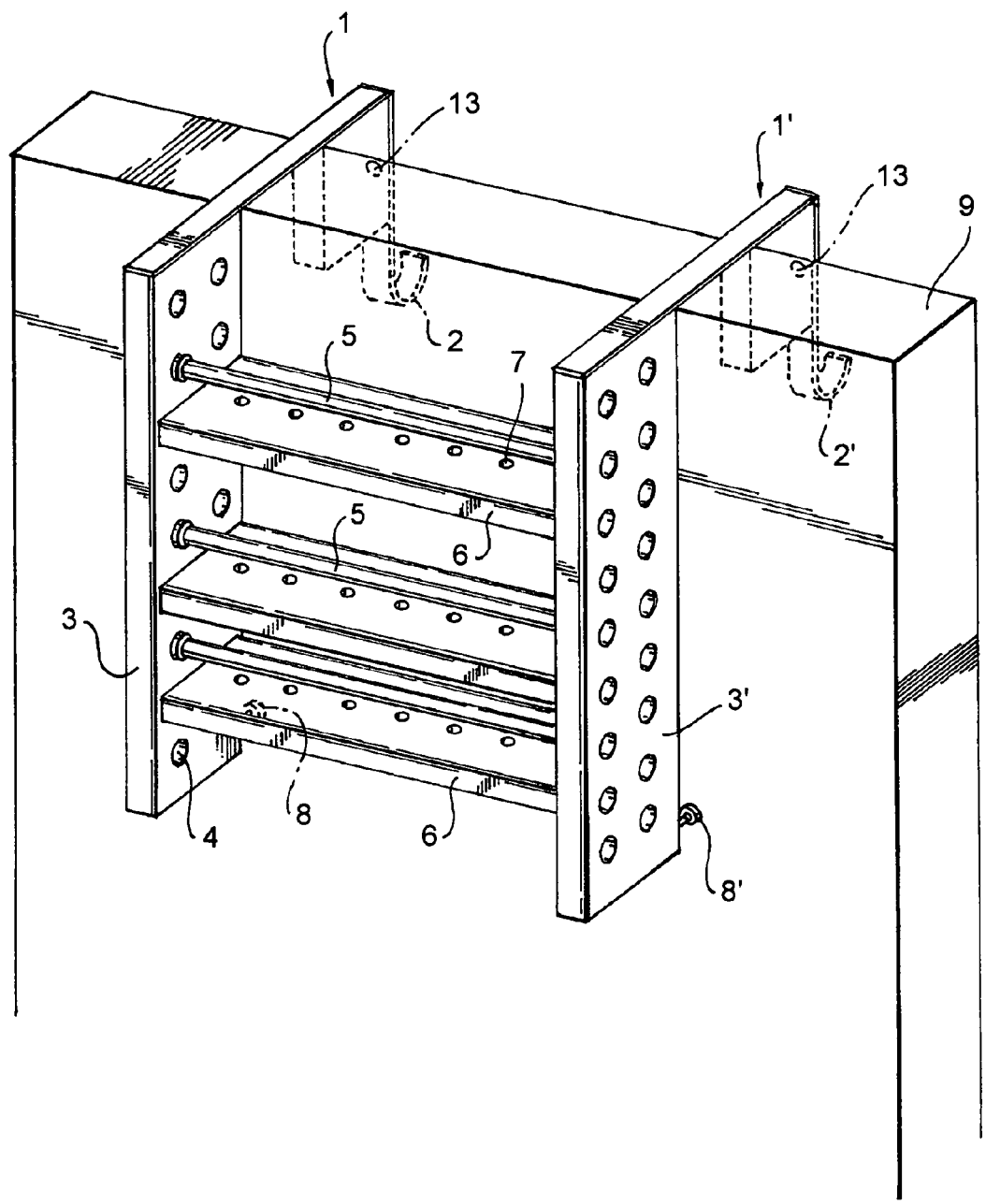
FIG. 1 presents a perspective view of the invented organizer device hanging over one shower wall.
Figure 2:
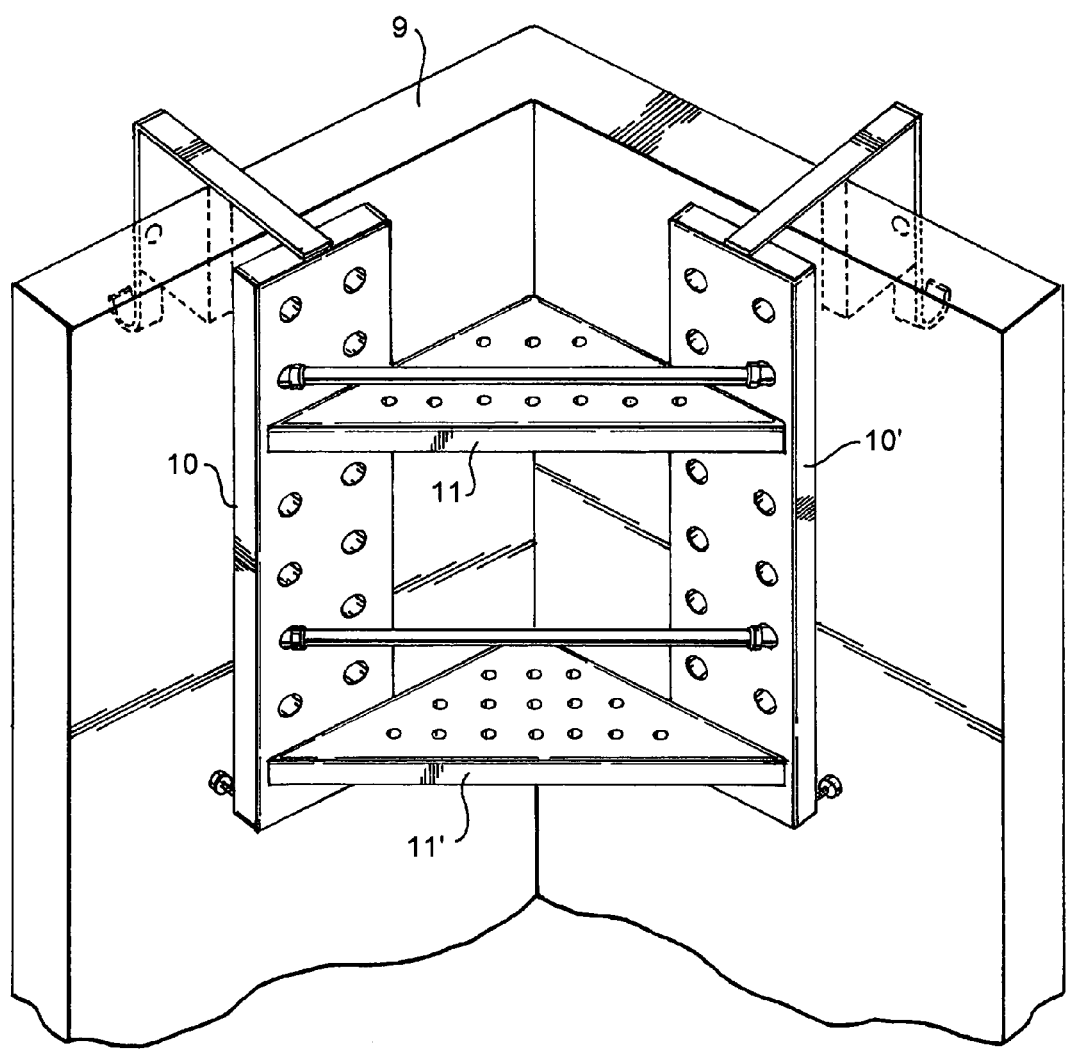
FIG. 2 presents a perspective view of the invented organizer device hanging over two shower walls in the corner.
Figure 3:
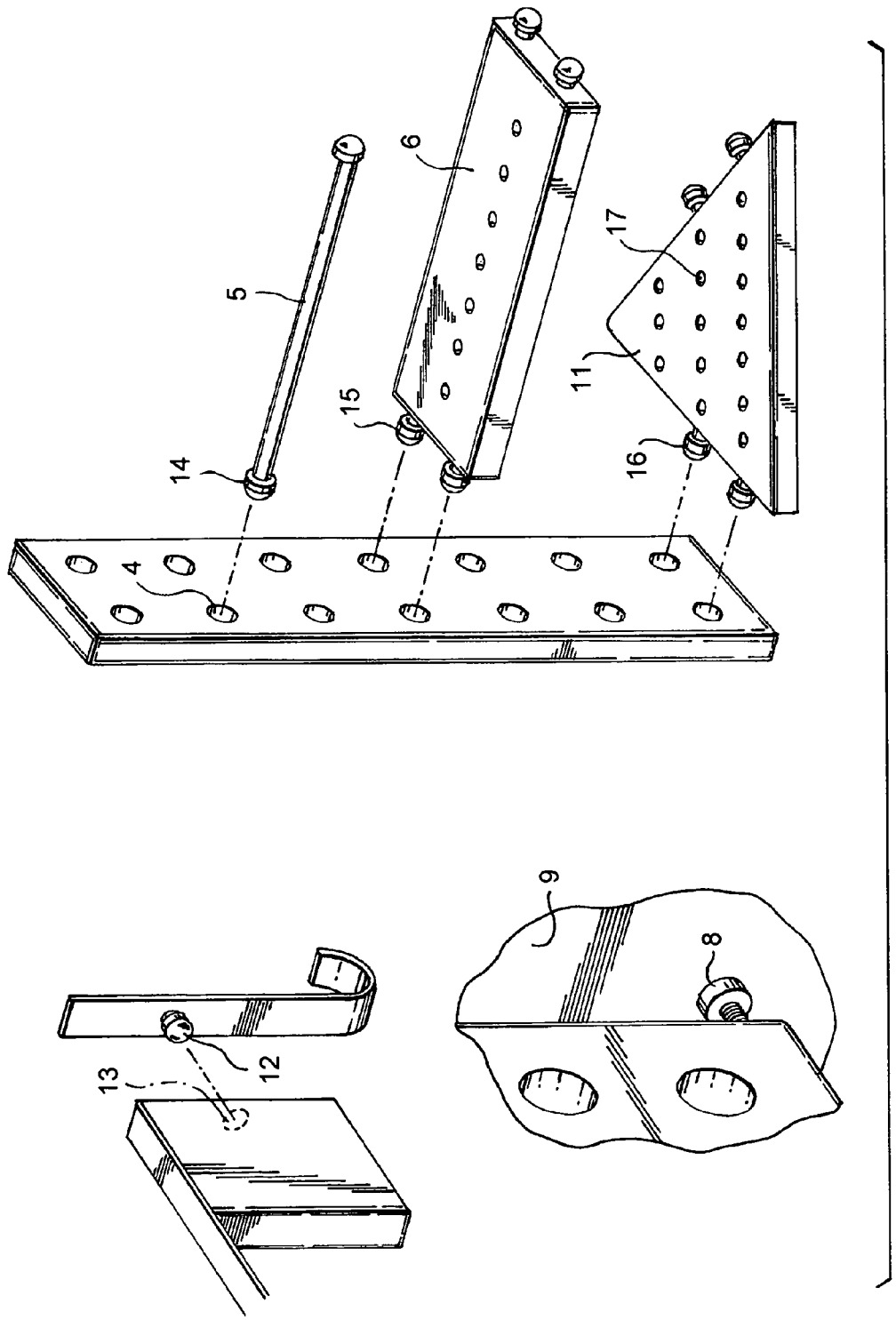
FIG. 3 presents perspective views of all the parts used in the invented organizer device.

The preferred embodiments may be understood by referring to FIG. 1-3, which depict perspective views of the current invention for one-wall organizer device and the corner organizer device, and the all the parts used in such invented organizer devices.

In the drawing of FIG. 1, the said one-wall organizer device is a plastic frame structure, basically having two rectangular-shaped solid plates built with snap-in holes placed at a number of different locations on the plates, horizontal shelves and bars built with snap-in knobs, and two wall hooks for holding the wall(s).

The present invention has been used as a storage and organizer device when there is a shower wall available in the shower area. This one-wall organizer device was hung on the top of a shower wall 9 by hooking the two wall hooks 1 and 1' over the wall. The gap between the wall hooks and the rectangular-shaped plates 3 and 3' permits such wall hooks to fit up and over the upper edges of the standard wall sections. There are two outside-wall hooks 2 and 2' snapped into the wall hook snap-in holes 13. These outside-wall hooks 2 and 2' are used to hang extra clothes or other stuff that are not within the shower area. The two wall hooks 1 and 1' are made from solid material such as plastic and are strong enough to hold the whole frame structure. Linked with each wall hook, there is a pair of laterally spaced apart (opposite to each other), straight vertical plates 3 and 3' built with plate snap-in holes 4. Between the two plates 3 and 3', there are bars 5 and shelves 6 for holding the shower accessories snapped into the plates 3 and 3'. Also, in each shelf 6, there are drainage holes 7 for water release. Lastly, there are two balance-screws 8 and 8' attached into one end of each plate for balancing the position of the frame structure with the shower wall and for distributing some weight on such shower caddy when full of shower accessories. Screwing in the balance-screw will shorten the distance between the frame structure and the shower wall; Screwing out the balance-screw will enlarge the distance between the frame structure and the shower wall. In FIG. 1, it is a three shelves shower caddy, the top and middle shelves with capacity to hold items with 8 inches height, the bottom shelf with capacity to hold items with 14 inches height. People can adjust the tiers by snapping in more or less horizontal bars and shelves that are removable. In addition, two of the above shelves and bars can be snapped into one tier to form a closed shelf by snapping second bar or second shelf into the snap-in holes at the back row of the snap-in holes which are closer to the wall. Such shower caddy could be made from plastic or rubber (light-weighted and against rusting) with different colors (attractive) as long as they are strong enough to hold the wall and big bottles used in the showers and they are soft enough to easily snap in the bars and shelves. Each bar or each shelf has two or four round snap-in knobs as male parts, and each plate has many evenly distributed two rows of snap-in holes as female parts. The snap-in mechanism used in this shower caddy will make this shower caddy adjustable and easy to be manufactured and transported.

In the drawing of FIG. 2, the said corner shower caddy comprises wall hooks shown in FIG. 1, two wall-parallel plates linked with its own wall hook and built with two rows of evenly distributed snap-in holes, triangular-shaped shelves built with snap-in knobs and drainage holes, and horizontal bars built with snap-in knobs.

This corner shower caddy has been used as a storage and organizer device when there are two shower walls available in the shower area. The wall hooks are the same as one-wall shower caddy shown in FIG. 1. The wall-parallel plates 10 and 10' are different from the plates 3 and 3' used in one-wall show caddy, which are parallel to the wall(s) and are built with the same snap-in holes. Also, there are horizontal bars and triangular-shaped shelves 11 and 11' located between such wall-parallel plates 10 and 10' by snapping in the knobs built at both end of the bars and at two sides of the triangular-shaped shelves. The same design as in one-wall shower caddy, there are drainage holes distributed in the triangular-shaped shelves. The snap-in knobs designed in this corner shower caddy are slightly different from the snap-in knobs used in the one-wall shower caddy in term of the angle toward the snap-in holes in the plates 10 and 10'. There are four snap-in knobs designed on two sides of the triangular-shaped shelf, each side has two snap-in knobs as shown in FIG. 2. With the right angle, the four snap-in knobs (as male parts) could be snapped in the snap-in holes (as female part) correctly to form a stable shelf. In FIG. 2, it is a two shelve corner shower caddy, the top shelf with capacity to hold items with 8 inches height, the bottom shelf with capacity to hold items with 14 inches height.

In the drawing of FIG. 3, except the above parts described in FIG. 1 and FIG. 2, the said snap-in mechanism is shown how to snap in different parts within the invented shower caddy including the corner shower caddy. The outside-wall hooks are built with snap-in knobs 12 and the wall hooks are built with snap-in holes 13 on one side of the wall hook block. In FIG. 3, there is an enlarged balance-screw 8 made from plastic with bigger head and how it touches the shower wall 9 with such a bigger head. The balance-screw 8 should be at 2-4 inches range and the bigger head of the balance-screw 8 will help to support the frame structure more efficiently. More importantly, FIG. 3 shows how the bar, the rectangular-shaped shelf and the triangular-shaped shelf snap into the snap-in holes within the plate by snapping the bar snap-in knob 14, the rectangular-shaped shelf snap-in knob 15, and the triangular-shaped shelf snap-in knob 16. Also, there are drainage holes 17 within the triangular-shaped shelf are indicated in FIG. 3.

The advantage of the present invention is to provide a portable, stable and adjustable organizer device, which has a simple, non-rust and light-weighted construction, is easy to clean without special care and maintenance, and is designed for large-scale manufacture and transportation. A more important feature of the present invention is to provide a snap-in mechanism for most its parts and a convenient method to hang this device over wall(s), which will stably store and organize larger and much more shower accessories than most of the conventional shower caddies in the market. The device of the present invention could be manufactured inexpensively and is affordable to all individuals. The present invention also provides a wall-hanging snap-in shower caddy for the shower corner when there are two walls available.

Although the wall-hanging snap-in organizer device and the method of using has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. An organizer device for holding items comprises a plastic frame structure, said frame structure having two rectangular-shaped plates each built with two rows of snap-in holes, horizontal shelves and horizontal bars each built with snap-in knobs, one or two balance-screws at the end of each rectangular-shaped plate, and two rectangular-shaped wall hooks each built with one snap-in hole and snapped with an outside-wall hook, wherein each said rectangular-shaped plate and a respective one of said wall hooks are connected to one another and between which there is a gap adapted to receive a wall or a similar support to hold and hang the organizer device.

2. An organizer device of claim 1 is made from plastic materials with different colors.

3. An organizer device of claim 1, wherein said horizontal shelves are each built with four of said snap-in knobs at with two of each snap-in knob located at a respective side of each said horizontal shelf and said horizontal bars are each built with two of said snap-in knobs at with each snap-in knob located at a respective end of each said horizontal bar, wherein the snap-in knobs of said horizontal shelves and said horizontal bars are snapped into said rectangular-shaped plates by snapping said snap-in knobs into the snap-in holes of the rectangular-shaped plates.

4. An organizer device of claim 1, wherein said horizontal shelves are built with four of said snap-in knobs and said horizontal bars are built with two of said snap-in knobs, wherein said snap-in knobs are removably connected to the snap-in holes of the rectangular-shaped plates for adjustment purpose.

5. An organizer device of claim 1, wherein said horizontal shelves are built with drainage holes for water release.

6. An organizer device of claim 1, wherein said balance-screws are screwed into one end of the rectangular-shaped plates and extend toward the wall(s) or similar support.

7. An organizer device of claim 1 is a shower caddy, which is adapted to be hung over a wall in a shower.

8. An organizer device of claim 1 is a corner shower caddy, which is adapted to be hung over two walls of a corner in a shower.

9. An organizer device of claim 8 further comprising said horizontal shelves each comprising a triangular-shaped shelf having drainage holes and each triangular-shaped shelf having four of said snap-in knobs with two of said snap-in knobs located at a respective side of each said triangular-shaped shelf, said horizontal bars each being built with two of said snap-in knobs each being located at a respective end of each said horizontal bar, and two of said balance screws at the end of each rectangular-shaped plate.

10. A method of storing and organizing items by hanging an organizer device of claim 1 over at least one wall or a similar support.

* * * * *